Feb. 26, 1957  A. G. SANGSTER  2,782,904
AUTOMATIC RECIPROCATING FEED DEVICE
Filed June 26, 1952  8 Sheets-Sheet 1

INVENTOR.
ARLON G. SANGSTER
BY
Charles R. Fay,
ATTORNEY

INVENTOR.
ARLON G. SANGSTER
BY
*Charles R. Fay,*
ATTORNEY

INVENTOR.
ARLON G. SANGSTER
BY Charles R. Fay
ATTORNEY

Feb. 26, 1957   A. G. SANGSTER   2,782,904
AUTOMATIC RECIPROCATING FEED DEVICE
Filed June 26, 1952   8 Sheets-Sheet 4
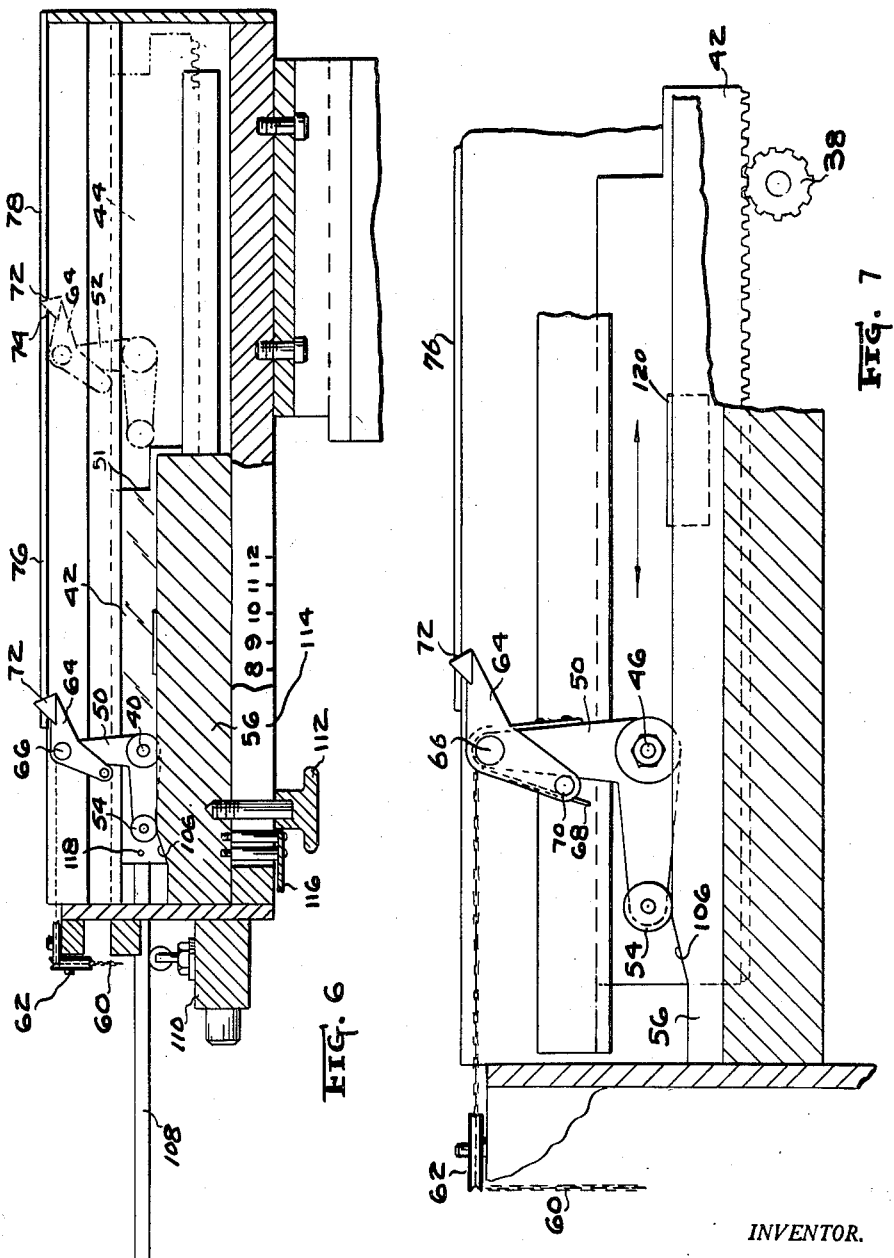
INVENTOR.
ARLON G. SANGSTER
BY
ATTORNEY Feb. 26, 1957  A. G. SANGSTER  2,782,904
AUTOMATIC RECIPROCATING FEED DEVICE
Filed June 26, 1952  8 Sheets-Sheet 5
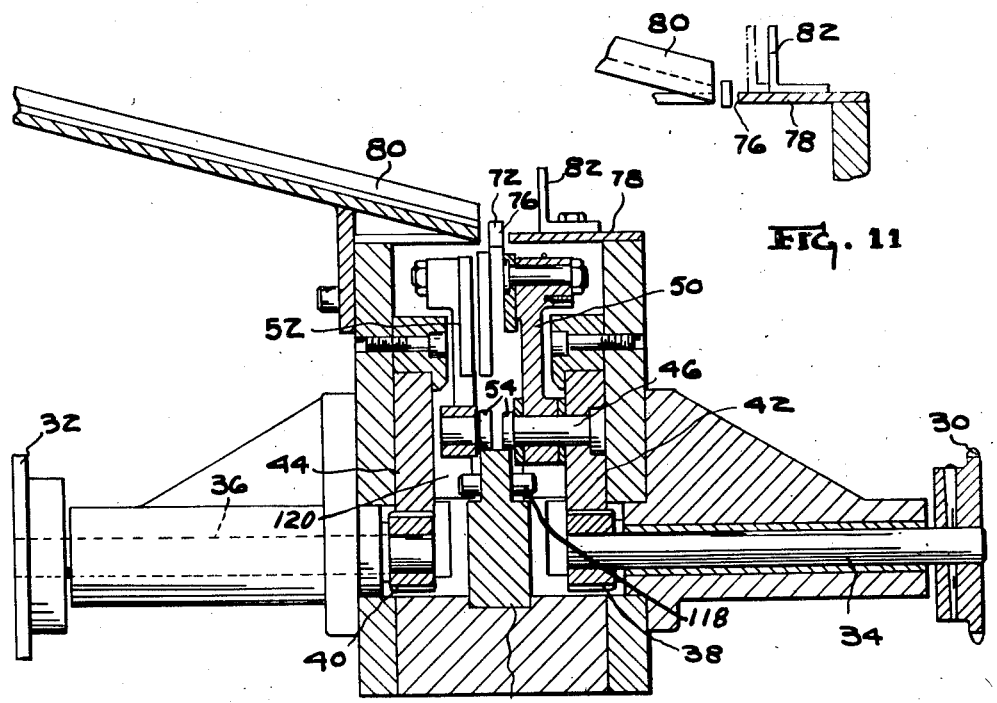
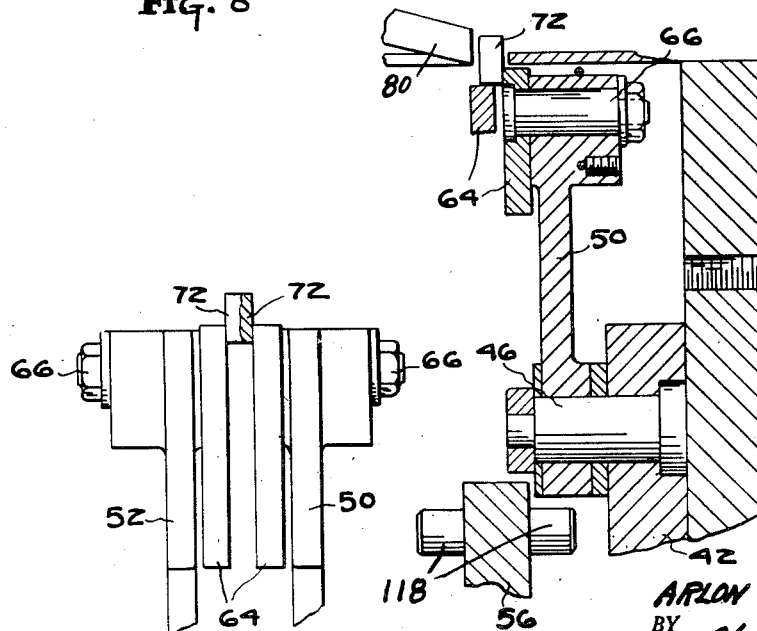
INVENTOR.
ARLON G. SANGSTER
BY
ATTORNEY

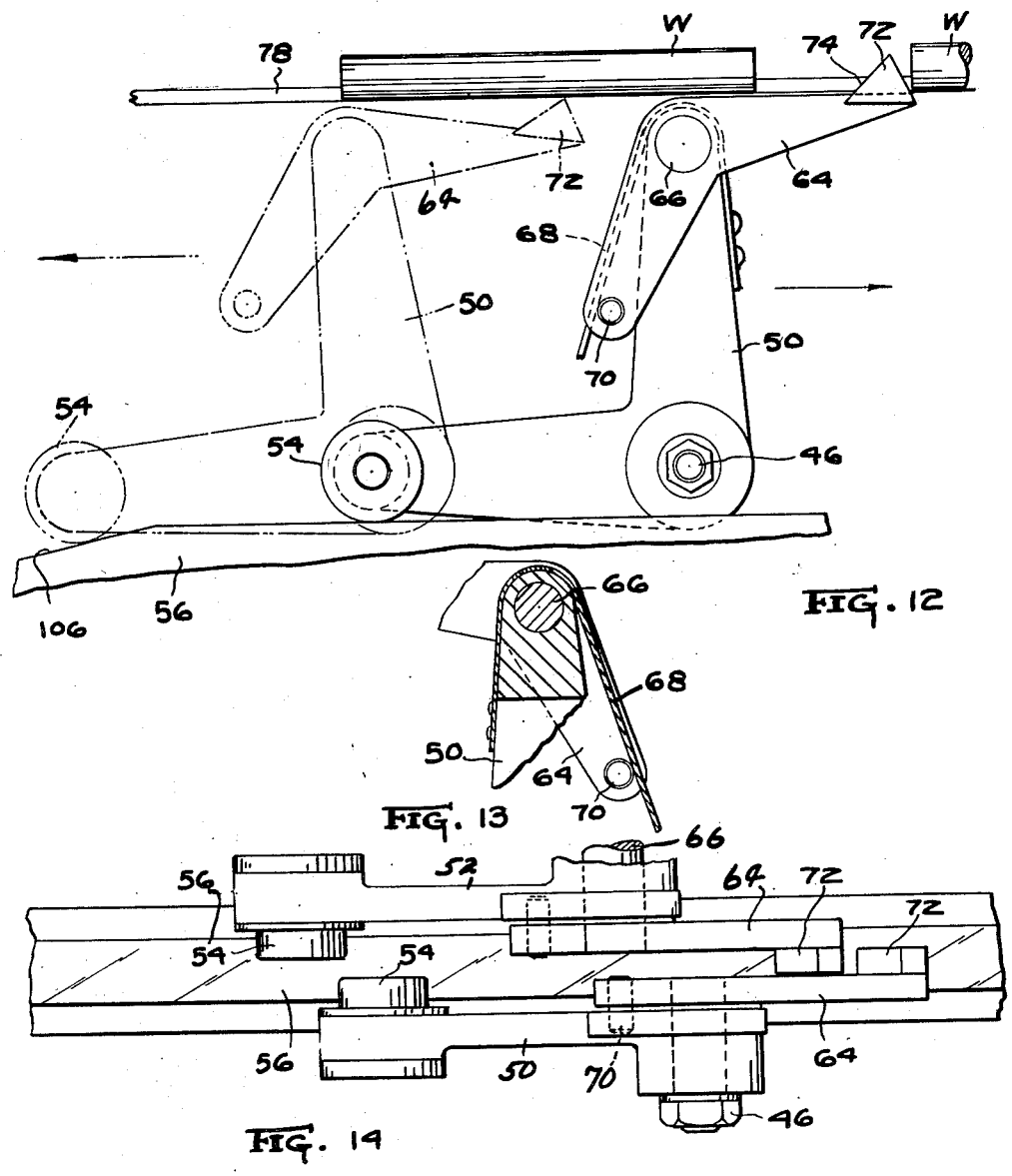

Feb. 26, 1957 A. G. SANGSTER 2,782,904
AUTOMATIC RECIPROCATING FEED DEVICE
Filed June 26, 1952 8 Sheets-Sheet 8

INVENTOR.
ARLON G. SANGSTER
BY
Charles P. Fay
ATTORNEY

United States Patent Office 2,782,904
Patented Feb. 26, 1957

2,782,904

AUTOMATIC RECIPROCATING FEED DEVICE

Arlon G. Sangster, Worcester, Mass., assignor to Arter Grinding Machine Company, Worcester, Mass., a corporation of Massachusetts Application June 26, 1952, Serial No. 295,745

12 Claims. (Cl. 198—221)

This invention relates to a feeding device to provide continuous in-line feeding of workpieces in abutting end-to-end relationship, so that each piece is in contact with the adjacent pieces, both forwardly and rearwardly thereof, and in which each piece causes the advance pieces to be fed forwardly.

The principal object of the invention resides in the provision of a device as above described and comprising a pair of alternately operative feeding fingers with means to move the same reciprocatingly and rectilinearly in the same path, one of said fingers receiving a piece to be fed forwardly and moving it ahead, while the other of the said feeding fingers is non-operative and moves downwardly under the piece being fed and under the operative finger to a position in the rear thereof, where it rises, becomes operative, and engages the next succeeding piece to be fed, feeding the same forwardly and over the previously operative member, now non-operative, and which automatically is retracted in the manner just described as to the other member; and the provision of the device aforesaid including simple and quickly operable adjustments for various sizes of workpieces.

A further object of the invention resides in the provision of an automatic feed device to ensure the feeding of workpieces so that they travel along a line in end-to-end pushing relationship, and comprising a variable speed motor driving a gear reducer, the latter having a double-ended shaft with an electro-magnetic clutch on each end thereof, these clutches being alternately energized and adapted to drive chain sprockets or the like driving means when the respective electro-magnetic clutch is energized, each of said sprockets driving a chain or the like to propel forwardly a rack in a rectilinear manner, each rack being arranged to slide horizontally in a track; there being a pivoted cam arm on each rack, each cam arm being provided with a pusher finger, the arms being arranged to be reciprocated on their respective racks in side-by-side relation and the pusher fingers overlapping each other, so that the pusher fingers are arranged in the same vertical plane, whereby the racks are operated, according to automatic energization control of the electro-magnetic clutches, to propel a respective pusher finger forwardly while the other is being retracted when the electro-magnetic clutch therefor is de-energized; and the provision of relatively simple and inexpensive control means for energizing and de-energizing the electro-magnetic clutches in regular timed sequence in order to carry out the push feeding function of the pusher fingers as above described.

A still further object of the invention resides in the provision of an extremely simple and easily effected adjustment for the racks so as to accommodate different lengths of workpieces by a single adjustment which is easily manually made and may be calibrated so as to show exactly what the adjustment for a new workpiece should be.

Other objects and advantages of the invention will appear hereinafter.

Reference is to be had to the accompanying drawings, in which:

Fig. 6 is a view in elevation, partly in section, illustrating the action of the pusher fingers;

Fig. 7 is a view in elevation on an enlarged scale, showing one of the pusher fingers not quite all the way retracted;

Fig. 8 is a transverse section through the feeding chute or track;

Fig. 9 is a section similar to Fig. 8 on a larger scale and parts omitted;

Fig. 10 is an enlarged detail of the feeding fingers;

Fig. 11 is a section through the track showing the adjustable fence;

Fig. 12 is a view on an enlarged scale illustrating the action of the feeding pusher fingers;

Fig. 13 is a section through the pivot mounting means of one of the fingers;

Fig. 14 is a plan view of the track;

Fig. 15 is a detail view of the pusher member on one of the pusher fingers;

In some industrial processes and machines, it is necessary to feed workpieces continuously in end-to-end abutting relationship, so that each workpiece thrusts or feeds forward the ones ahead of it, or in other words, there must be no gaps between the workpieces which must be kept butted together. An example of the need for such feeding resides in the hardening of continuously travelling pieces, as for instance through an induction coil.

Figure 1:
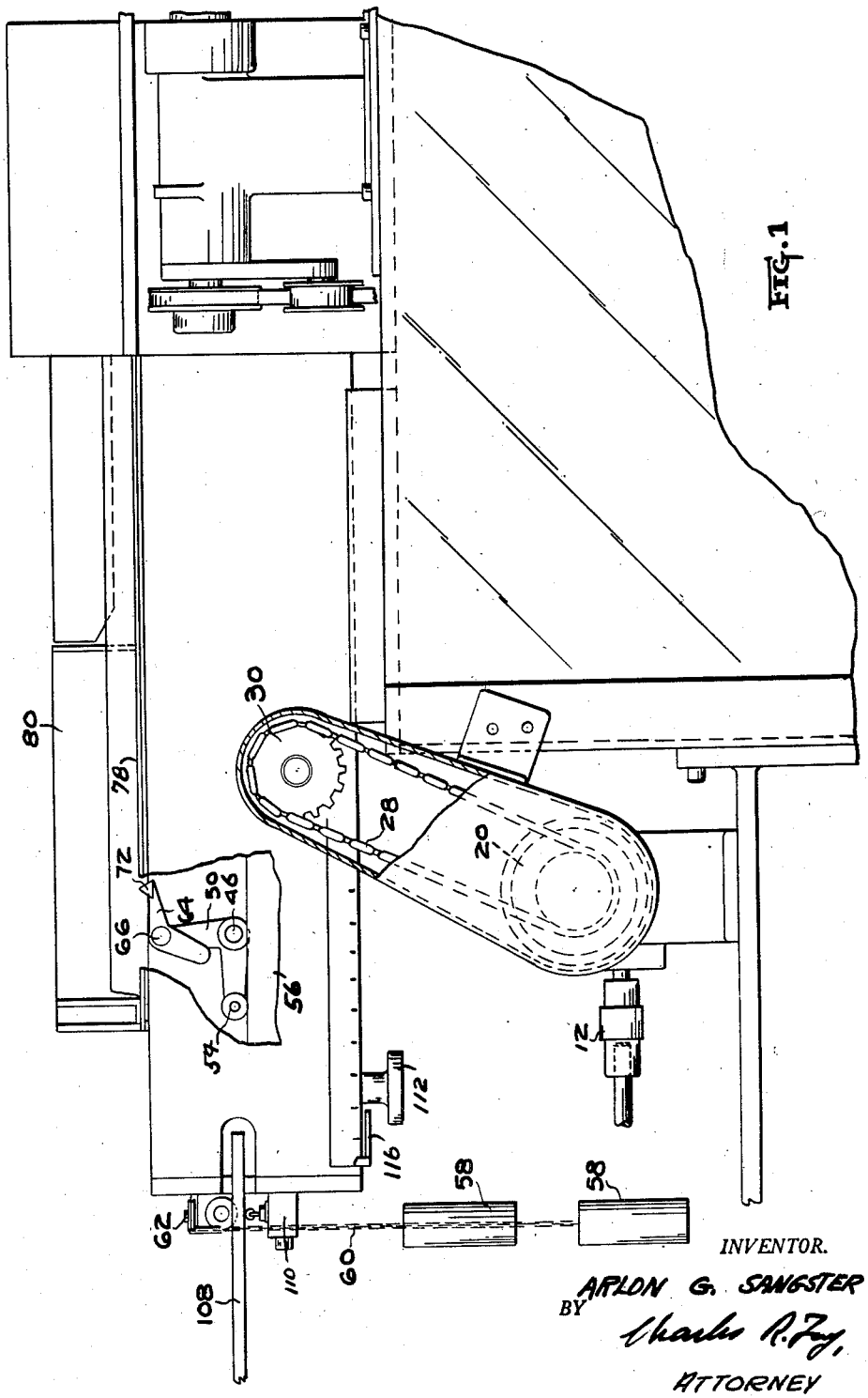
Fig. 1 is a view in side elevation of a machine according to the present invention.
Figure 2:
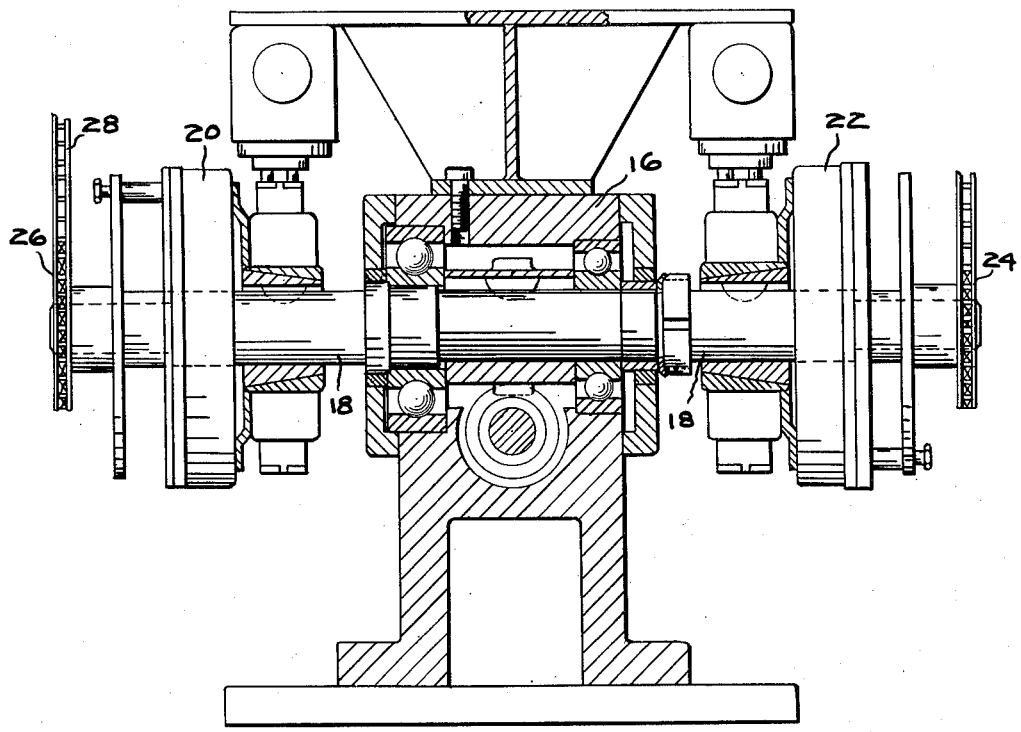
Fig. 2 is a transverse section through the shaft of the gear-reducer and showing the positions of the electro-magnetic clutches.
Figure 3:
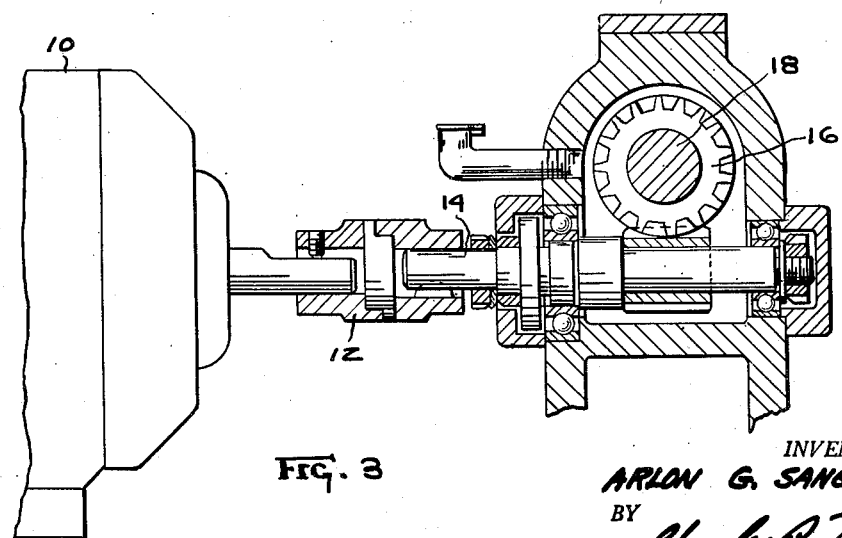
Fig. 3 is a longitudinal section through the speed reducer.

Turning now to Figs. 1, 2 and 3, there is shown a motor 10, which is clutched at 12 to drive shaft 14 of a speed reducer generally indicated at 16. This speed reducer has a driven shaft 18 which is double, i. e., it extends out at each end of the housing for the gear reducer, thus providing two separate driving shafts. Each one of these shafts has mounted thereon one element as at 20, 22 of an electro-magnetic clutch, the same being provided with a driven element so as to drive sprockets 24 and 26. Clearly when either clutch 20 or 22 is energized, it will drive its respective sprocket and in this case the clutches are adapted to be energized generally alternately, so that but one sprocket 24, 26 is driven at one time.

Each of the sprockets is provided with a drive chain 28 driving respective sprockets 30 and 32 (see Fig. 8), these sprockets being keyed to shafts 34 and 36. Shafts 34 and 36 at their respective inner ends thereof are provided with spur gears 38 and 40 and looking at these gears in Fig. 8, the gear 40 is a left-hand gear and the gear 38 is a right-hand gear. The shafts, gears, sprockets, etc. are all of course appropriately mounted and have bearings, etc. applied thereto in cases where needed.

The respective gears 38 and 40 are meshed with horizontal racks 42 and 44 respectively and are arranged upon energization of the respective electro-magnetic clutches to drive said racks forwardly. Each rack has pivoted thereto, as by means of a pin 46, 48, a right-hand pusher cam arm 50 and a left-hand pusher cam arm 52 respectively. Each cam arm is in the form of a bell crank and has a generally vertical arm and a generally horizontal arm, see particularly Figs. 6, 7 and 12. The rear end of each horizontal arm is provided with a roller indicated at 54 that runs on a longitudinal cam indicated at 56 and of course each pivoted cam arm 50 and 52 is provided with the same type of construction. These arms are arranged in side-by-side relation as clearly shown in Fig. 8.

In order to return the racks and the cam arms pivoted thereto to retracted position, weights 58 are connected to cords or the like 60 in turn connected to the top ends of the respective cam arms 50, 52, and not only return the latter to retracted position on the non-operative stroke of the arms, but also tend to pivot the bell cranks in a counter-clockwise direction, as seen in Figs. 7, 12, etc., so that the rollers 54 are maintained in contact with cams 56 and the upright arm portions of the bell cranks are kept upright. The cords 60 are properly trained on idlers 62 as required.

The vertical arm portion of each cam arm has pivoted thereto at the top thereof a pusher finger member 64, again in the general form of a bell crank pivoted at 66. A spring 68 is secured to the upright portion of arm 50 and bears on a cross pin 70 on the pusher finger member 64 to normally resiliently urge the same in a counter-clockwise direction, see Figs. 7, 12, etc. This construction leaves the pusher finger member 64 free to be depressed from the normal upper operative position shown in solid lines in Fig. 12 to the lower inoperative retractive position shown in the same figure.

The pusher finger member 64 has a pusher finger 72 secured thereto and these actually contact the workpieces W and push them to the right. The pusher fingers 72 are in the same vertical plane and are depressible each by the other to pass each other on the retractive stroke, using the surface 74 as a cam. The workpieces themselves depress the retractive finger as will be more fully described hereinafter. The face of each finger 72 is at 90° or on an arc relative to its pivot, so that the work is not advanced as the finger is lowered.

The pusher fingers 72 project upwardly through a slot 76 in the track 78, the hopper or chute 80 being set at an angle or otherwise arranged to deliver workpieces W to the track. The hopper can be adjusted for length, etc., and the track has a rail 82 for adjustment relative to slot 76 to allow for centering pieces W of different diameter.

Figure 4:
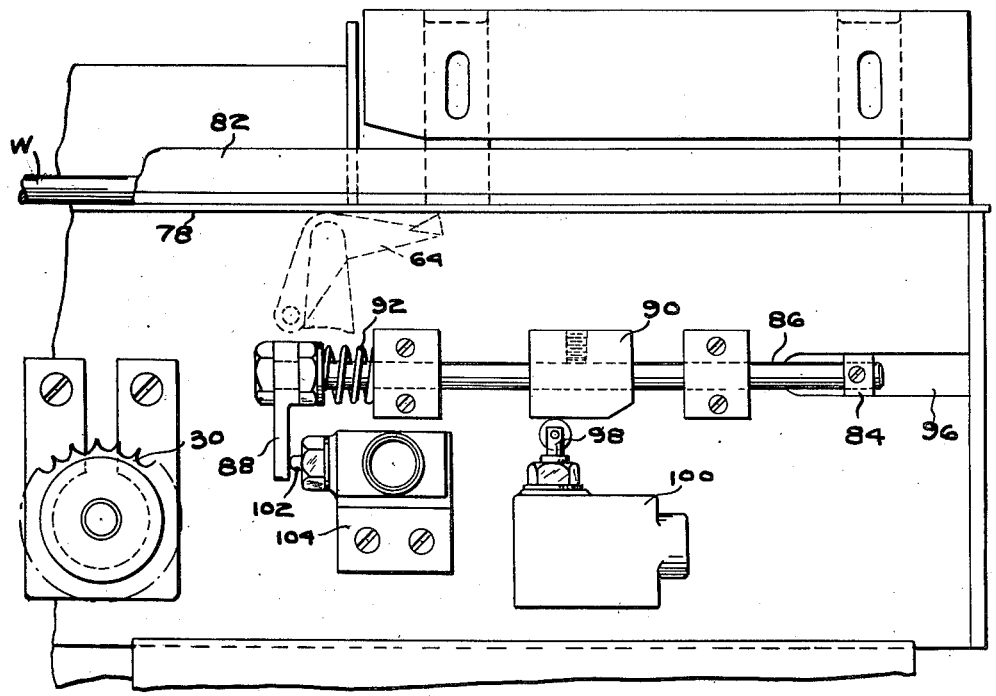
Fig. 4 is a view in elevation on an enlarged scale, illustrating the feeding end of the machine.
Figure 5:
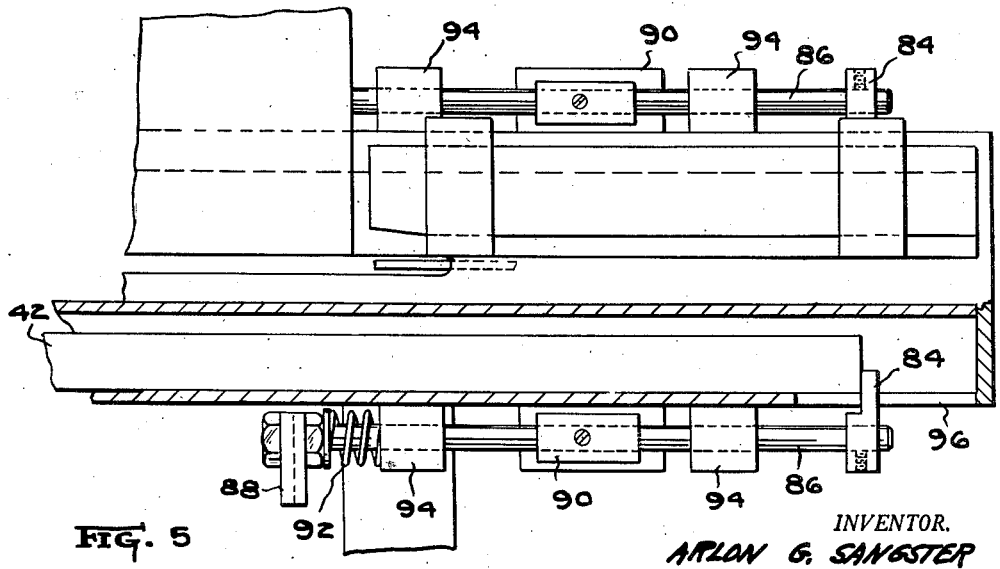
Fig. 5 is a plan view of the parts of Fig. 4.
Figure 16:
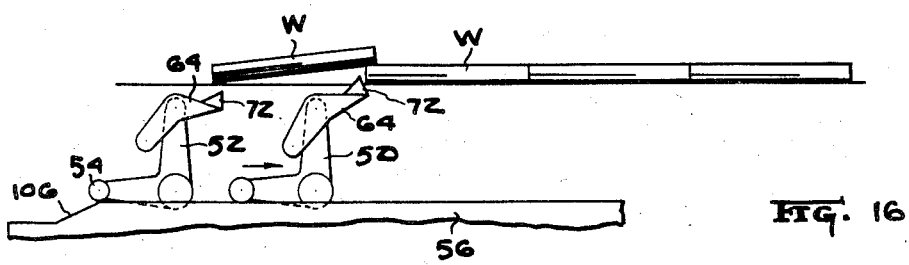
Figs. 16, 17 and 18 illustrate the progressive action of the pusher fingers.

Referring now to Figs. 4 and 5, the respective racks in their forward motion contact blocks 84 on sliding rods 86 and these racks each carry a switch arm 88 and a switch cam 90, being retracted by a spring 92. The racks are mounted in bosses 94 and the blocks 84 project through a frame or wall slot at 96 to be located in the paths of the racks housed in the frame of the machine. The cam 90 is arranged to ride on and off a switch actuator 98 for a switch in box 100, and the arm 88 actuates a switch contact means 102 in a switch box 104. When the switch actuator 98 for rack 42 is depressed, this causes energization of magnetic clutch 20, to start forward the cam arm 52, and when switch actuator 102 is depressed by the rack 42 reaching its forward limit of travel, clutch 22 is de-energized and rack 42 is retracted by its weight 58. Thus each rack starts the cycle for the other rack, but terminates its own forward motion.

Figure 17:
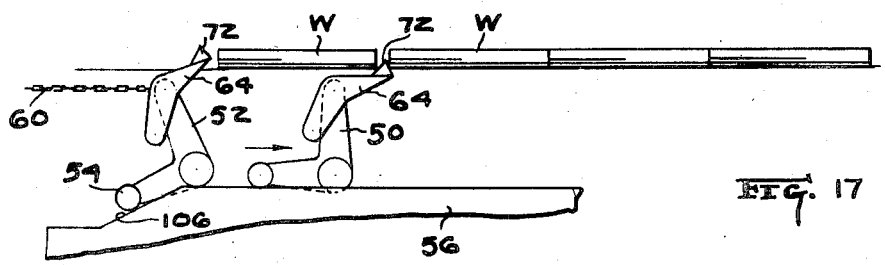
Figure 18:
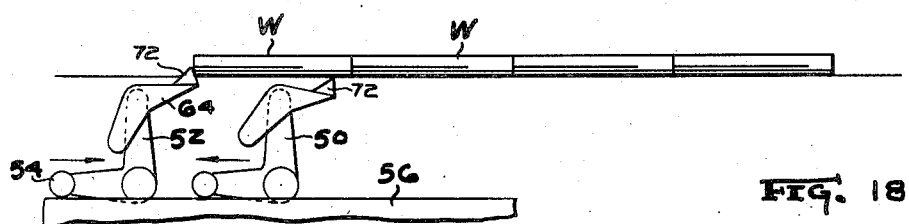
Figure 19:
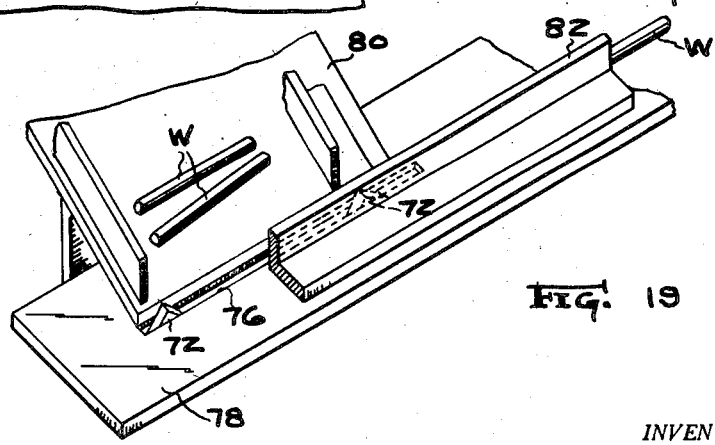
Fig. 19 is a perspective view illustrating the track and the work chute.
Figure 20:
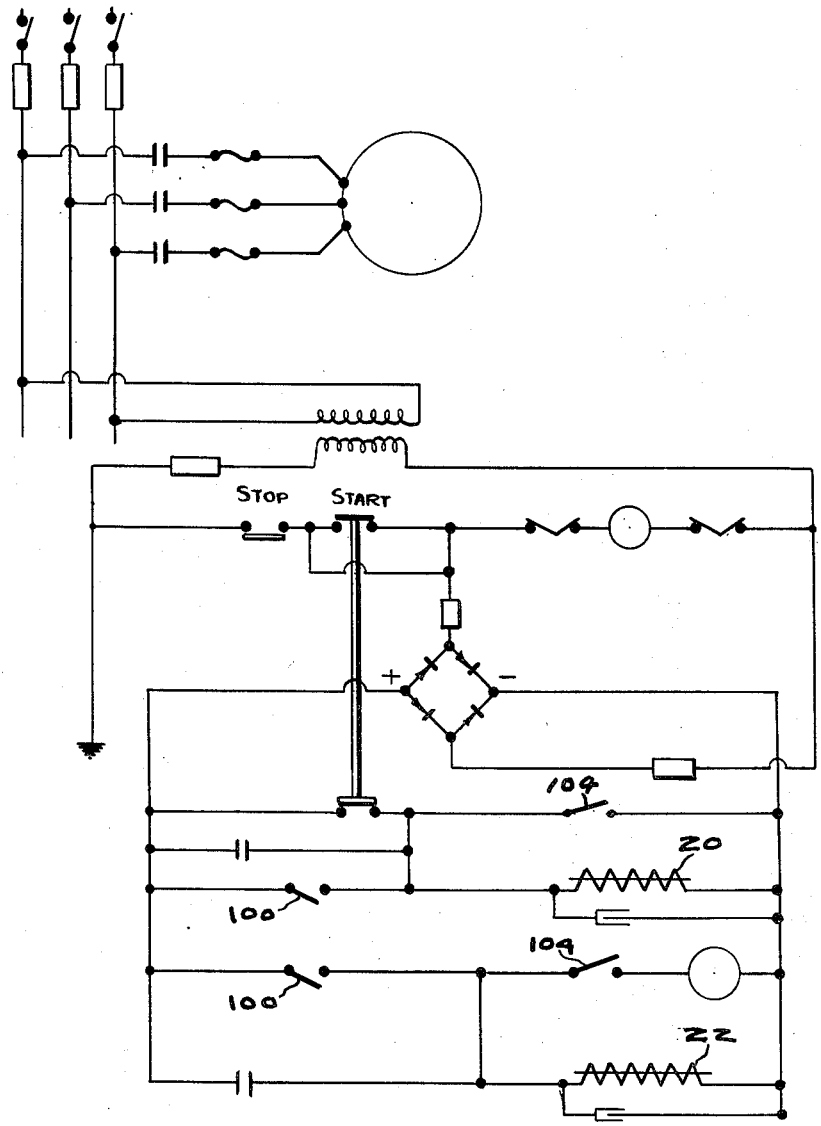
Fig. 20 is a simple wiring diagram.

Cam 56 has an incline or relief at its rear end at 106, and the weights 58 cause the respective cam arms to tilt to the left at the extreme end of the left-hand travel of the racks, Fig. 17. This separates the pusher fingers 72 farther than the racks would otherwise allow, and provides room on the track for the next piece W1 to drop into place between the fingers 72 of arm 52 and the piece ahead. As the rack 44 for arm 52 moves ahead, the cam follower 54 rises on the incline 106 and accelerates the work in relation to the rack motion, causing work W1 to push ahead at a faster rate and to butt against the work 50, Fig. 18, and results in a uniform discharge rate with no gaps between the workpieces.

The arm 108 in Fig. 6 is a control arm for a switch 110, and this arm can be made irregular to suit conditions desired in the machine to which the pieces are fed. For instance, an electric device such as a heating coil can thus be controlled according to the rack movement, i. e., according to the travel of the work.

The cam 56 serves for both cam arms, and is easily rectilinearly adjusted for different lengths of workpieces, merely by loosening wheel 112 (Fig. 6) and moving the same in slot 114, again tightening the wheel against the edges of the slot. The wall of the machine may be calibrated or indicated as to the adjustment by a finger 116, so that the adjustment is fast and accurate. Each rack is carried with the cam in the adjustment of the latter by reason of pins 118 impinging on blocks 120 on the racks, so that the action is always the same.

The operation of the apparatus is as follows:

The work chute guide 80 is set to accommodate the length of the workpieces desired. The cam 56 is adjusted with reference to a graduated scale to suit the length of the workpieces. The leading workpiece rolls down the inclined chute and stops against guide 82. In this position, the work is resting ahead of the pusher fingers. With reference to wiring diagram, it will be noted that when the "start" button is contacted, this action causes the motor to start and at the same time energizes electromagnet clutch 20. This drives the rack 44 and corresponding pusher finger 72 forward. The forward or leading surface of the finger 72 is more nearly vertical than the rearward surface, as clearly shown in Fig. 12, and thus the workpiece ahead of the finger is pushed forwards, but upon retraction, the finger slides down under the next workpiece. This forward motion continues, finally tripping switch 100 which energizes clutch 22 and causes the rack 42 to move forward. At this time, another workpiece has dropped ahead of the finger for rack 42 so the latter is caused to move forward, thereby following the first workpiece. As the rack 44 continues to advance, it operates switch 104 which de-magnetizes the clutch 20 and allows the weight 58 to return rack 44 to its original position. The rack 42 continues forward and trips the switch 100 on the other side, which again energizes the clutch 20, thereby starting the rack forward with another workpiece.

It will be seen that this invention provides a work feeding machine accomplishing the objects initially stated and infinitely variable adjustment can be made to suit lengths of work, there is ample space for the acceptance of work from the chute or hopper, yet the uniform discharge rate is maintained, the cam 108 is easily changed by a single screw fastener at 118, if desired for different ensuing operations, the adjustments in all cases are extremely easy and rapidly accomplished, and the mechanical and electrical mechanisms are relatively simple and inexpensive to make.

Having thus described my invention and the advantages thereof, I do not wish to be limited to the details herein disclosed, otherwise than as set forth in the claims, but what I claim is:

1. Automatic feed device for feeding pieces in line in abutting relation and comprising a plurality of workpiece feeder fingers each arranged to travel in a linear path, means to advance and retract said fingers generally alternately to engage and feed the workpieces on the advance, and means to accelerate each feeder finger relative to said finger advancing means to engage the leading end of the workpiece traveled thereby with the trailing end of the next previous workpiece.

2. Automatic feed device for feeding pieces in line in abutting relation and comprising a plurality of reciprocating arms arranged in side-by-side relation, means to reciprocate the arms generally alternately, a yielding feeder finger on each arm, said feeder fingers being arranged in a common path, means on each feeder finger to cause another feeder finger to be yieldingly displaced upon contact of said feeder finger in the travel thereof in a direction to feed, and means to accelerate each finger at the start of the feed stroke.

3. The feed device of claim 2 wherein said means comprises a member including a slanting surface to be engaged by a like member on another feeder finger so that the member is depressed, and resilient means to return the member to original position.

4. Automatic feed device for feeding pieces in line in abutting relation and comprising a plurality of reciprocating arms arranged in side-by-side relation, a yielding feeder finger on each arm, said feeder fingers being arranged in a common path, and means on each feeder finger to cause another feeder finger to be yieldingly displaced upon contact of said feeder finger in the travel thereof, means to reciprocate the feeder fingers to feed forwardly a line of pieces on advance of the individual feeder fingers, the latter being displaced on the retractive stroke.

5. Feed device comprising a base, a plurality of feeding arms therein, means to advance and retract the arms, and a feeding finger on each arm, said fingers being in a common path, means providing for the feeding fingers to slip past each other, means to accelerate the advance feeding stroke of each arm to abut each article fed with the next previous article, and means to control the start and stop of each advance stroke of each feeding arm, the latter being pivoted, the accelerating means including a cam, and a cam follower on each arm riding on the cam to cause the respective arm to pivot at a predetermined point in the travel thereof.

6. Feed device comprising a base, a plurality of feeding arms therein, means to advance and retract the arms, and a feeding finger on each arm, said fingers being in a common path, means providing for the feeding fingers to slip past each other, means to accelerate the advance feeding stroke of each arm to abut each article fed with the next previous article, and means to control the start and stop of each advance stroke of each feeding arm, the latter being pivoted, the accelerating means including a cam, and a cam follower on each arm riding on the cam to cause the respective arm to pivot at a predetermined point in the travel thereof, the pivot action being to widen the spacing of the relative feeding fingers, travel in the opposite direction causing the arm to return to original position to obviate the increase in said spacing.

7. Feed device comprising a base, a plurality of reciprocatingly mounted racks therein, means to advance and retract the same generally alternately, a pivoted arm on each rack and traveling therewith, a feeding finger on each arm, an elongated cam, a cam follower on each pivoted arm, means normally holding the arms erect, said cam having an incline providing for depression of the follower and tilting of the arm on one stroke and elevation of the follower and return to original position on the other stroke.

8. Feed device comprising a base, a plurality of reciprocatingly mounted racks therein, means to advance and retract the same generally alternately, a pivoted arm on each rack and traveling therewith, a feeding finger on each arm, an elongated cam, a cam follower on each pivoted arm, means normally holding the arms erect, said cam having an incline providing for depression of the follower and tilting of the arm on one stroke and elevation of the follower and return to original position on the other stroke, means to longitudinally adjust the cam, the racks being substantially adjustable therewith to adjust the strokes of the arms.

9. Feed device comprising a base, a plurality of reciprocatingly mounted racks therein, means to advance and retract the same generally alternately, a pivoted arm on each rack and traveling therewith, a feeding finger on each arm, an elongated cam, a cam follower on each pivoted arm, means normally holding the arms erect, said cam having an incline providing for depression of the follower and tilting of the arm on one stroke and elevation of the follower and return to original position on the other storke, rack operated limit switch means to terminate each forward stroke, and rack operated means to initiate the forward stroke of a different arm prior to the end of the forward stroke of the advancing rack.

10. Feed device comprising a base, a motor, a driven shaft therefor, a pair of magnetic clutches on the shaft, a rack adapted to be driven intermittently by each clutch, a feeding arm on each rack, means to energize each clutch including a switch, means to operate each switch by a rack driven by the other clutch to initiate the stroke of a rack, and means to de-energize each clutch at the end of the stroke of a rack, said de-energizing means including a limit switch effective to be operated by the rack that is to be returned to original or starting position.

11. Feed device comprising a base, a motor, a shaft therefor, a pair of magnetic clutches on the shaft, a longitudinally movable rack driven in one direction by each separate clutch, means to energize each clutch, said means including a switch operated by the rack operated by the other clutch, de-energizing means for each clutch arranged to be operated at the end of the stroke of the respective racks, constant pull means returning the racks to original position upon de-energization of the clutches, and a feed arm on each rack.

12. Feed device comprising a base, a motor, a shaft therefor, a pair of magnetic clutches on the shaft, a longitudinally movable rack driven in one direction by each separate clutch, means to energize each clutch, said means including a switch operated by the rack operated by the other clutch, de-energizing means for each clutch arranged to be operated at the end of the stroke of the respective racks, constant pull means returning the racks to original position upon de-energization of the clutches, and a feed arm on each rack, a finger on each arm, a spring to maintain each finger in raised operative feeding position, said finger being in the same rectilinear path and being depressible out of the path when passing each other, as one rack advances and the other retracts.

References Cited in the file of this patent
UNITED STATES PATENTS

| | | |
|---|---|---|
| 1,522,116 | Gray et al. | Jan. 6, 1925 |
| 1,838,780 | Miller | Dec. 29, 1931 |
| 2,402,056 | King | June 11, 1946 |
| 2,529,775 | McInnis | Nov. 14, 1950 |
| 2,559,369 | Phillips | July 3, 1951 |
| 2,620,060 | Bird | Dec. 2, 1952 |